United States Patent
Cromer et al.

(10) Patent No.: US 7,814,532 B2
(45) Date of Patent: Oct. 12, 2010

(54) DATA PROCESSING SYSTEM AND METHOD FOR PASSWORD PROTECTING A BOOT DEVICE

(75) Inventors: Daryl Carvis Cromer, Apex, NC (US); Joseph Wayne Freeman, Raleigh, NC (US); Steven Dale Goodman, Raleigh, NC (US); Eric Richard Kern, Durham, NC (US); Randall Scott Springfield, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 2705 days.

(21) Appl. No.: 09/847,085

(22) Filed: May 2, 2001

(65) Prior Publication Data

US 2002/0166072 A1    Nov. 7, 2002

(51) Int. Cl.
    G06F 7/04      (2006.01)
    G08B 29/00     (2006.01)
    G06F 9/00      (2006.01)
    G06F 15/177    (2006.01)
(52) U.S. Cl. ............ 726/2; 726/4; 726/26; 726/27; 726/29; 726/34; 713/1; 713/2; 713/100; 713/165; 713/183; 713/193
(58) Field of Classification Search ........ 713/1–2, 713/100, 200–202, 164, 165, 193; 709/223–229; 726/2, 4, 6, 34–36
See application file for complete search history.

(56) References Cited

U.S. PATENT DOCUMENTS

| 4,942,606 A |   | 7/1990  | Kaiser et al. |
|-------------|---|---------|---------------|
| 5,241,594 A |   | 8/1993  | Kung |
| 5,265,163 A | * | 11/1993 | Golding et al. ......... 713/202 |
| 5,268,960 A |   | 12/1993 | Hung et al. |
| 5,291,585 A | * | 3/1994  | Sato et al. ............. 710/10 |
| 5,363,446 A | * | 11/1994 | Ruppertz et al. ........ 713/1 |
| 5,375,243 A | * | 12/1994 | Parzych et al. ......... 713/202 |
| 5,434,562 A |   | 7/1995  | Reardon |
| 5,513,263 A |   | 4/1996  | White et al. |
| 5,708,777 A |   | 1/1998  | Sloan et al. |
| 5,828,831 A |   | 10/1998 | Kong |
| 5,854,905 A | * | 12/1998 | Garney ................ 710/104 |

(Continued)

OTHER PUBLICATIONS

Boling, Mar. 30, 1993, PC Magazine, v12, n6, p. 314(5).*

(Continued)

*Primary Examiner*—Christian LaForgia
*Assistant Examiner*—Jenise E Jackson
(74) *Attorney, Agent, or Firm*—Antony P. Ng; Dillon & Yudell LLP

(57) ABSTRACT

A data processing system and method of password protecting the boot of a data processing system are disclosed. According to the method, in response to an attempt to boot the data processing system utilizing a boot device, the boot device is interrogated for a password. If the boot device supplies password information corresponding to that of a trusted boot device, the data processing system boots utilizing the boot device. If, however, the boot device does not supply password information corresponding to that of a trusted boot device, booting from the boot device is inhibited. In a preferred embodiment, the password information comprises a unique combination of the boot device's manufacturer-supplied model and serial numbers.

2 Claims, 3 Drawing Sheets

U.S. PATENT DOCUMENTS

| | | | | |
|---|---|---|---|---|
| 5,892,906 A | * | 4/1999 | Chou et al. | 713/202 |
| 5,991,875 A | * | 11/1999 | Paul | 713/2 |
| 6,035,395 A | | 3/2000 | Saito | |
| 6,067,625 A | * | 5/2000 | Ryu | 713/202 |
| 6,122,733 A | * | 9/2000 | Christeson et al. | 713/2 |
| 6,154,836 A | * | 11/2000 | Dawson et al. | 713/1 |
| 6,161,178 A | * | 12/2000 | Cromer et al. | 713/2 |
| 6,247,126 B1 | * | 6/2001 | Beelitz et al. | 713/1 |
| 6,353,885 B1 | * | 3/2002 | Herzi et al. | 713/1 |
| 6,484,308 B1 | * | 11/2002 | Pearce et al. | 717/128 |
| 6,530,019 B1 | * | 3/2003 | Carroll | 713/2 |
| 6,622,243 B1 | * | 9/2003 | Christeson | 713/1 |
| 6,658,562 B1 | * | 12/2003 | Bonomo et al. | 713/1 |
| 7,406,604 B2 | * | 7/2008 | Berry et al. | 713/193 |
| 2005/0289073 A1 | * | 12/2005 | Schull | 705/59 |

OTHER PUBLICATIONS

Steers, May 2000, PC World, 18, 5, 256.*

Taylor, Sep. 1986, PC Magazine, v5, p. 213(6).*

Santalesa, Rich, *Slam the lid, batten down the hatches and tighten up Windows.—How to Secure NT*, Windows Magazine, Aug. 1, 1998, pp. 208-216.

Demaria, Michael J., *The safe way to remote consoles*, Network Computing, Sep. 17, 2001, pp. 91-94.

Bannan, Karen J., *HP Enters 8-Way Server Fray*, PC Week, Dec. 1, 1997, vol. 14, No. 50.

Musich, Paula, *NetIQ AppManager to support Domino*, PC Week, Dec. 1, 1997, vol. 14, No. 50.

U.S. Appl. No. 09/206,686, Related Copending Application, filed Dec. 7, 1998.

* cited by examiner

DATA PROCESSING SYSTEM AND METHOD FOR PASSWORD PROTECTING A BOOT DEVICE

CROSS-REFERENCE TO RELATED APPLICATION

This application is related to U.S. application Ser. No. 09/206,686, filed Dec. 7, 1998, now issued as U.S. Pat. No. 6,161,178, which is assigned to the assignee of the present application and incorporated herein by reference.

BACKGROUND OF THE INVENTION

1. Field of the Invention

The present invention relates in general to data processing systems and, in particular, to a data processing system and method for maintaining security while booting the data processing system. Still more particularly, the present invention relates to a data processing system and method for password protecting the boot of the data processing system.

2. Description of the Related Art

A typical personal computer (PC) system includes a central processing unit (CPU), volatile and non-volatile memory, a display, a keyboard, one or more disk drives, a CD-ROM drive, a pointing device such as a mouse, and an optional network interface card. One of the distinguishing characteristics of PCs is the use of a motherboard or system planar to electrically interconnect these components. Commercially available examples of PCs include the Aptiva™ and Thinkpad™ series of computers available from International Business Machines of Armonk, N.Y.

The startup software of a conventional PC includes Power-On Self-Test (POST) software to initialize the system components and Basic Input/Output System (BIOS) software to interface the keyboard, mouse and other peripherals. The BIOS software includes a configuration routine that permits a user to select an order in which potential boot devices are checked by the BIOS at startup for an operating system (OS), as well as an OS loader routine that loads the OS from the boot device. For currently available PCs, the list of potential boot devices is generally limited to the hard disk, floppy disk and CD-ROM drives and, optionally, the network interface card.

When unattended, a conventional PC is vulnerable to use by unauthorized user to access confidential information either stored within the PC itself or accessible to the PC through a network. Conventional operating system password protection is relatively ineffective in preventing unauthorized use of a PC because, absent some security mechanism, an unauthorized user can simply use the BIOS configuration routine to select a boot device of choice (e.g., a floppy disk or CD-ROM drive) and boot the PC from the selected boot device utilizing the unauthorized user's own software.

In view of such security concerns, some PCs implement password protection for the BIOS configuration routine so that an unauthorized user cannot change the order in which devices are checked by BIOS for an operating system. Thus, if an operating system is detected on the hard disk drive, an unauthorized user cannot boot the PC from a floppy disk or CD-ROM. The security of a PC may alternatively or additionally be enhanced, as discussed in the above-referenced co-pending application, by requiring a user to enter a password before certain classes of devices can be accessed as a boot device. If necessary, security can be even further enhanced by providing an alarm or lock mechanism to deter removal or opening of the cabinet housing of the PC. Such additional security enhancements deter an unauthorized user from removing the hard disk drive, which may be password protected, and substituting an unprotected hard disk drive in order to gain access to the PC.

The foregoing security precautions have proven effective in preventing an unauthorized user from booting PCs that contain all possible boot devices within their cabinet housing. However, the introduction of new computer interfaces has raised new concerns regarding boot security. For example, the Universal Serial Bus (USB) provides a user accessible interface outside of the cabinet housing of a PC that permits attachment of a large number of peripheral devices. The current commercial USB implementation (i.e., USB 1.1) restricts the devices that may be attached to the USB to fairly low data rate devices, such as printers, cameras, scanners, and floppy disk drives. Because a USB floppy disk drive typically replaces an in-chassis floppy disk drive in the BIOS-defined boot order, existing security mechanisms, such as password protection of the BIOS configuration routine, prevent an unauthorized user from accessing a PC by attaching the user's own USB floppy disk drive and booting from a floppy disk.

However, the present invention recognizes that emerging peripheral connection technologies such as USB 2.0 support much higher data rates and therefore again make a PC vulnerable to unauthorized booting from a USB 2.0 hard disk drive or CD-ROM drive. For example, if a user has a PC that is configured to boot from a USB 2.0-compliant hard disk drive (which may even be password protected), it is a trivial exercise for an unauthorized user to connect his own hard disk drive in lieu of the password protected hard disk drive and access the PC. Moreover, such unauthorized access would be difficult to detect because none of the conventional tamper detection mechanisms would be triggered by swapping USB devices.

Therefore a need exists for a data processing system and method for providing security that prevent an unauthorized boot of a computer.

SUMMARY OF THE INVENTION

A data processing system and method of password protecting the boot of a data processing system are disclosed. According to the method, in response to an attempt to boot the data processing system utilizing a boot device, the boot device is interrogated for a password. If the boot device supplies password information corresponding to that of a trusted boot device, the data processing system boots utilizing the boot device. If, however, the boot device does not supply password information corresponding to that of a trusted boot device, booting from the boot device is inhibited. In a preferred embodiment, the password information comprises a unique combination of the boot device's manufacturer-supplied model and serial numbers.

The above as well as additional objectives, features, and advantages of the present invention will become apparent in the following detailed written description.

DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DESCRIPTION OF A PREFERRED EMBODIMENT

Figure 1:
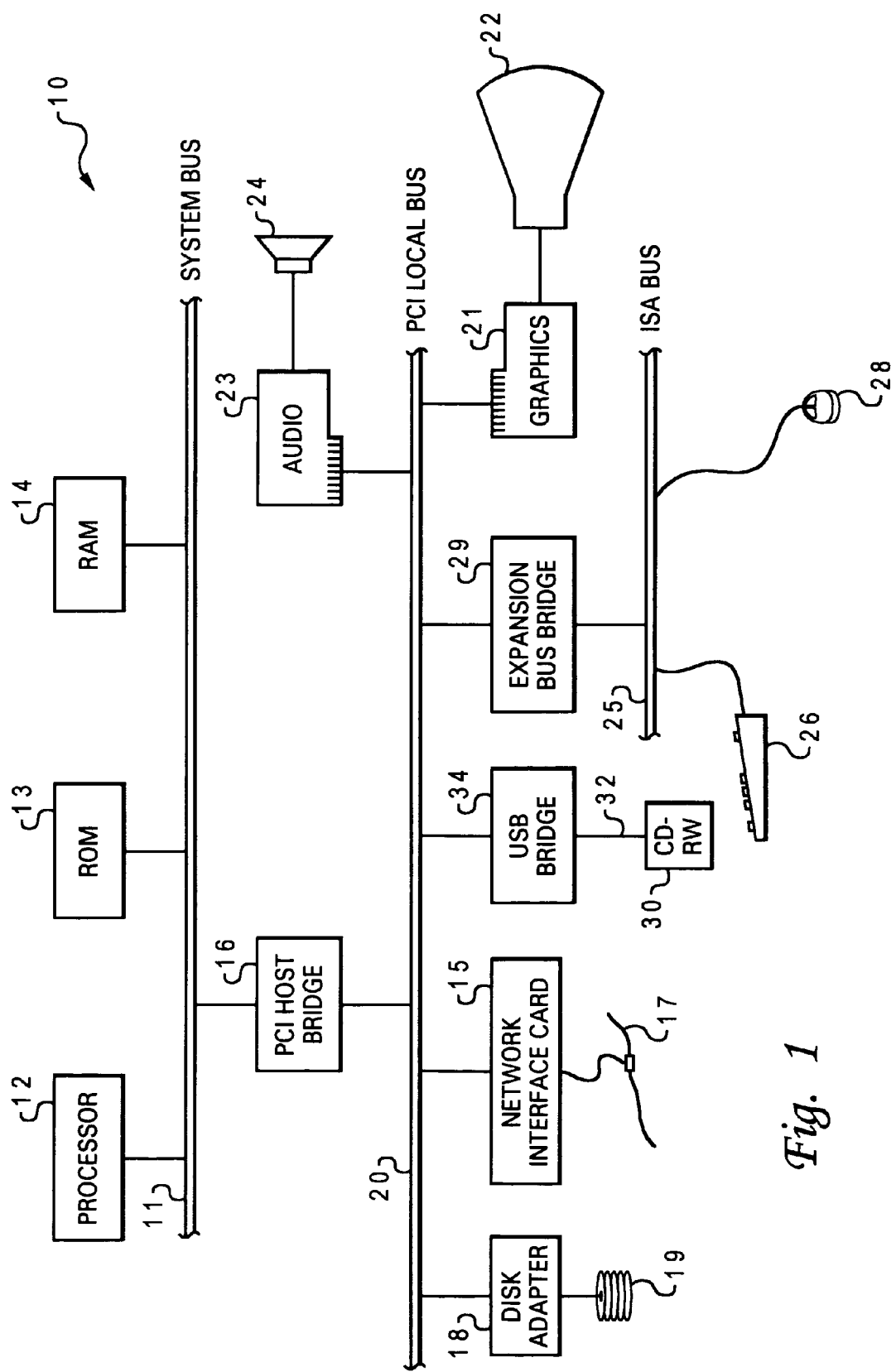
FIG. 1 is a high level block diagram of a data processing system having a boot security mechanism in accordance with the present invention.

With reference now to the figures and in particular with reference to FIG. 1, there is illustrated a high level block diagram of a data processing system in accordance with a preferred embodiment of the method and system of the present invention. Although those skilled in the art will recognize that the depicted data processing system is a personal computer system (PC), it should be appreciated that the present invention is not limited to PCs, but is also applicable to other data processing systems.

As shown in FIG. 1, computer system 10 has a system bus 11 connected to a central processing unit (CPU) 12, which executes software instructions and controls the operation of computer 10. During operation, CPU 12 utilizes system bus 11 to access data and instructions within read-only memory (ROM) 13, which stores startup software such as POST and BIOS, and dynamic random access memory (DRAM) 14, which provides storage for operating system and application data and instructions. System bus 40 is coupled to a Peripheral Component Interconnect (PCI) local bus 20 via PCI host bridge 16. PCI host bridge 16 provides both a low latency path through which CPU 12 may directly access PCI devices mapped to bus memory and/or I/O address spaces and a high bandwidth path through which PCI devices may directly access DRAM 14.

The PCI devices connected to PCI local bus 20 include a disk adapter 18, which provides an interface for a hard disk drive 19, and a network interface card (NIC), which provides a wired or wireless interface to a communication network 17. In order to present audio and video data to a user, computer system 10 is further equipped with a PCI-compatible audio controller 23 and graphics controller 21, which drive stereo speakers 24 and display device 22, respectively.

PCI bus 50 is further coupled to an expansion bus, such as ISA bus 25, via expansion bus bridge 29. Coupled to ISA bus 25 via an unillustrated I/O controller are conventional devices, such as a keyboard 26 and mouse 28. Other peripheral devices, such as CD-Rewritable (CD-RW) drive 30 (as well as cameras, printers, hard and floppy disk drives, etc.) can be interfaced to PCI local bus 20 via USB bridge 34 and an externally accessible port of Universal Serial Bus (USB) 32. In a preferred embodiment, USB 32 supports USB 2.0, which allows a data transfer rate of 480 Mbit/s, thus making it convenient to connect boot devices external to the cabinet housing of computer system 10. More information regarding USB 2.0 can be found in the Universal Serial Bus Revision 2.0 specification, which is available from the USB Implementers Forum, Inc., and is incorporated herein by reference.

Figure 2A:
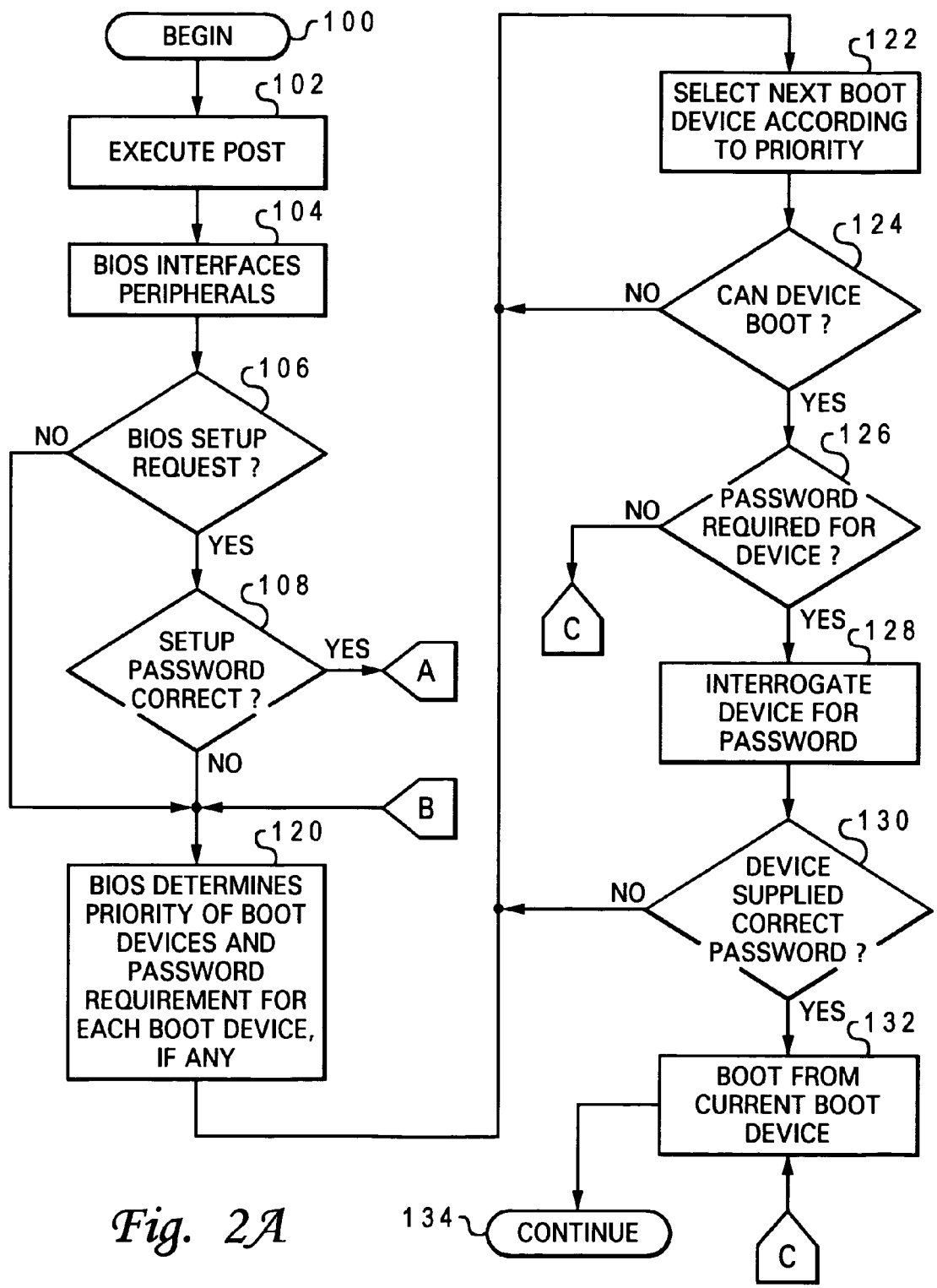
FIG. 2A is a high level logical flowchart illustrating a password-protected boot process in accordance with a preferred embodiment of the present invention.

Referring now to FIG. 2A, there is illustrated a high level logical flow chart of the startup of a computer system having a password protected boot sequence in accordance with the method and system of the present invention. The process depicted in FIG. 2A begins at block 100, for example, in response to power on or power-on-reset (POR) of computer system 10. The process then proceeds to block 102, which illustrates CPU 12 executing POST software out of ROM 13 so that the components of computer system 10 are placed in a known, stable state. Next, as shown at block 104, CPU 12 begins execution of BIOS software, for example, to interface key peripherals, such as keyboard 26, mouse 28, and display 22. As depicted at block 106, the BIOS software determines whether a request to enter the BIOS configuration routine has been received. A user may request to enter the BIOS configuration routine, for example, by depressing a designated function key (e.g., F1) of keyboard 26 during the execution of the BIOS software. If no request to enter the BIOS configuration routine is received, the process passes to block 120, which is described below. However, if a BIOS configuration request is received, the BIOS software prompts the user to enter a configuration password. As described above, entry to the BIOS configuration routine is preferably password protected to prevent unauthorized changes to the order (priority) in which boot devices are checked for a bootable operating system at system startup. If the user does not enter the correct configuration password, the process passes to block 120, which is described below. If, however, the user enters the correct configuration the process proceeds from block 108 through page connector A to the BIOS configuration routine illustrated in FIG. 2B.

Figure 2B:
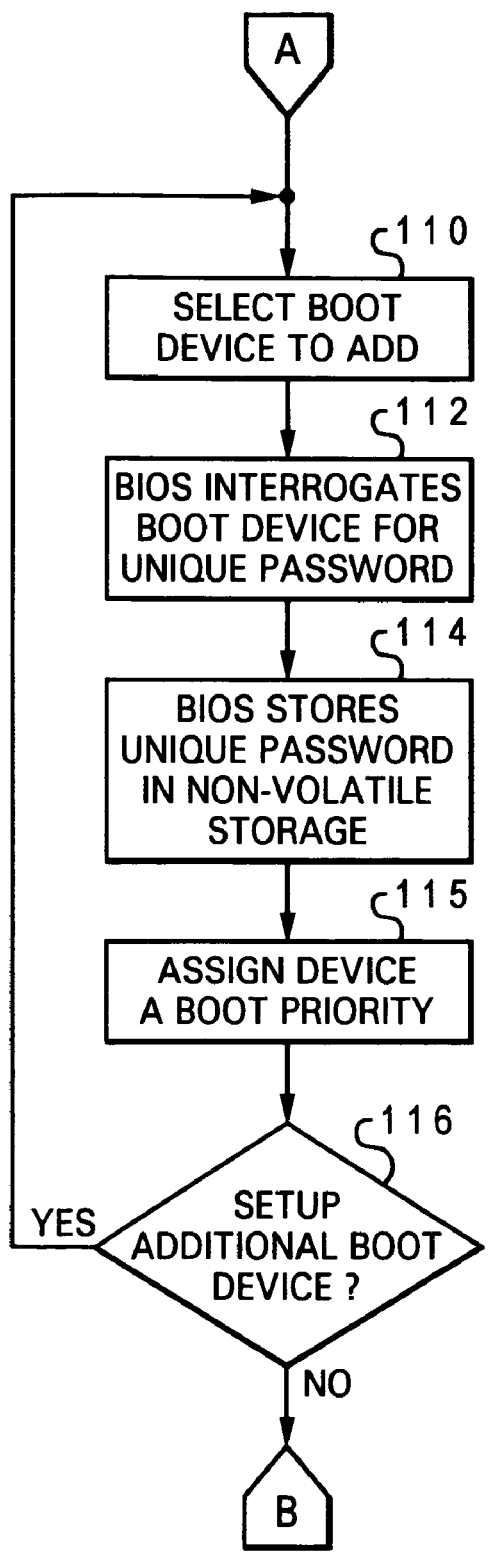
FIG. 2B is a high level logical flowchart depicting a BIOS configuration routine utilized to add trusted boot devices to a computer system in accordance with a preferred embodiment of the present invention.

With reference now to FIG. 2B, there is illustrated a high level logical flowchart of a BIOS configuration routine utilized to add and prioritize trusted boot devices of a computer system in accordance with a preferred embodiment of the present invention. Following page connector A, the process passes to block 110, which illustrates selection of a boot device to add as a trusted boot device from which computer system 10 will be allowed to boot. The user may select the boot device, for example, by utilizing mouse 28 or keyboard 26 to select from among a menu of boot devices displayed in a dialog box within display 22. Next, as illustrated, at block 112, the BIOS configuration routine interrogates the selected boot device for a unique device password that will be utilized during startup to verify that the boot device is a trusted device from which computer system 10 is permitted to boot.

In a preferred embodiment, the unique device password for the boot device is a combination of the model and serial number of the boot device. As will be appreciated by those skilled in the art, most manufacturers of devices that can serve as boot devices (e.g., optical, hard disk, floppy disk, and Zip™ drives) store the manufacturer's name, device model number and device serial number in either one-time programmable read-only memory (OTPROM) or electrically erasable programmable read-only memory (EEPROM) in the device. Many bootable devices are designed to supply such information in response to commands, such as the USB 2.0 "Get Device Descriptors" command or similar commands within the Integrated Device Electronics (IDE), Serial IDE and SCSI command sets. Because modification of the model and serial numbers require specialized knowledge and equipment (and possibly disassembly of the bootable device) and is therefore beyond the capabilities of most individuals, the use of the manufacturer-specified model and serial numbers as a password offers a reasonable level of security.

After the boot device selected for addition to the boot sequence has provided the BIOS configuration routine with a unique password, the BIOS configuration routine stores the unique password in non-volatile storage at block 114, preferably after hashing the password with a selected encryption algorithm. The hashed password may be stored, for example, in non-volatile RAM (NVRAM), in a security chip, or on hard disk drive 19. As illustrated at block 115, the newly added boot device is then assigned a priority in the boot sequence either by the user or by the BIOS configuration routine. A determination is then made at block 116 whether or not the user wishes to set up an additional boot device, for example, by prompting the user with a dialog box displayed within display 22. If so, the process returns to block 110-115, which have been described. If, however, the user does not wish to set up an additional boot device, the BIOS configuration routine exits and returns to block 120 of FIG. 2A through page connector B.

Referring again to FIG. 2A, block 120 illustrates the BIOS software determining the priority of boot devices present in computer system 10 and the password requirement of each boot device, if any. As shown at blocks 122-134, the BIOS software then scans through the list of boot devices in sequence from the highest priority device to the lowest priority device to locate the highest priority device from which computer system 10 can boot an operating system. Thus, at block 122, the BIOS software selects the highest priority boot device that has not been checked for an operating system from the list of possible boot devices. Next, block 124 illustrates the BIOS software determining whether or not the selected boot device is capable of booting an operating system. If not, the process returns to block 122, where the boot device having the next highest priority is selected. If, however, a determination is made at block 124 that the selected boot device is capable of booting the computer system, the process passes to block 126, which depicts the BIOS software determining whether or not a correct entry of a password is required to boot from the selected boot device. If a password in not required (e.g., because the selected boot device is in-cabinet hard disk drive 19), the process passes to block 132, which illustrates booting an operating system for computer system 10 from the selected boot device. Processing thereafter continues at block 134 under the control of the operating system.

Returning to block 126, in response to a determination that entry of a password is required to boot from the selected boot device, the process proceeds to block 128, which depicts the BIOS software interrogating non-volatile storage in the selected boot device for a device password. For example, if the selected boot device under consideration is CD-RW drive 30, the step illustrated at block 128 may entail sending CD-RW device 30 a USB 2.0 "Get Device Descriptors" command, as discussed above. The BIOS software then determines at block 130 whether or not the correct password was entered, for example, by hashing a string formed by concatenating the boot device's model and serial numbers and comparing the resulting hash with the stored hashes of one or more trusted boot devices. If a correct device password was not entered, the process returns to block 122, thereby signifying that the device from which a boot was attempted is not a trusted device from which computer system 10 is permitted to boot. If, however, a determination is made at block 130 that the correct password was obtained from the boot device, the process passes to block 132, which illustrates the BIOS software booting an operating system utilizing the selected boot device. Thereafter, processing continues under the control of the operating system at block 134.

As has been described, the present invention provides an improved method and system for password protecting the boot of a computer system. In accordance with the present invention, before a boot device is permitted to boot the data processing system, the data processing system interrogates the boot device for a password corresponding to a trusted boot device. If the boot device supplies a password corresponding to a trusted device, then the boot device is permitted to boot the data processing system. If the boot device fails to supply a password corresponding to that of a trusted device, then the boot device is not permitted to boot the data processing system. In this manner, boot security of the data is enhanced with password protection that cannot easily be circumvented by an unauthorized who connects his own boot device to a USB port or other externally accessible connector of the data processing system.

While a preferred embodiment has been particularly shown and described, it will be understood by those skilled in the art that various changes in form and detail may be made therein without departing from the spirit and scope of the present invention. For example, although the present invention has principally been described with reference to an embodiment that protects a computer system from booting from an unauthorized USB boot device, the present invention is not limited to such embodiments, but is instead applicable to other externally connectable boot devices including those complying with the IEEE 1394 (also referred to by the trademarks FireWire™ or i.Link™) standard. Moreover, although aspects of the present invention have been described with respect to a computer system executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method, comprising:
during a boot process, interrogating a plurality of boot devices within a data processing system in sequence according to a priority order until a boot devices supplies a device password corresponding to that of a trust boot device; and
in response to said boot device supplying a device password corresponding to that of said trusted boot device, booting said data processing system utilizing said boot device without the entry of any of said device password corresponding to that of said trusted boot device by a human user.

2. A data processing system, comprising:
a plurality of boot devices;
a processor; and
a memory coupled to said processor for communication, wherein said memory includes startup software capable of being executed by said processor during a boot process, wherein said startup software interrogates said plurality of boot devices in sequence according to a priority order until a boot device supplies a device password corresponding to that of a trusted boot device and, in response to said boot device supplying said device password, boots said data processing system utilizing said boot device without the entry of any of said device password by a human user.

* * * * *